United States Patent
Sethi et al.

(10) Patent No.: US 8,799,893 B2
(45) Date of Patent: Aug. 5, 2014

(54) METHOD, SYSTEM AND COMPUTER PROGRAM PRODUCT FOR SOLUTION REPLICATION

(75) Inventors: Manish Sethi, New Delhi (IN);
Kalapriya Kannan, Karnataka (IN);
Manish Gupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 12/251,994

(22) Filed: Oct. 15, 2008

(65) Prior Publication Data

US 2010/0095297 A1    Apr. 15, 2010

(51) Int. Cl.
G06F 9/50 (2006.01)
G06F 17/30 (2006.01)
G06F 21/31 (2013.01)

(52) U.S. Cl.
CPC .............. G06F 9/50 (2013.01); G06F 17/303 (2013.01); G06F 21/31 (2013.01); G06F 2201/84 (2013.01)
USPC .............................................. 718/1; 709/220

(58) Field of Classification Search
CPC ....................................................... G06F 9/50
See application file for complete search history.

(56) References Cited

U.S. PATENT DOCUMENTS

| | | | |
|---|---|---|---|
| 6,370,681 B1 * | 4/2002 | Dellarocas et al. ........... | 717/110 |
| 6,728,877 B2 | 4/2004 | Mackin et al. | |
| 7,356,679 B1 * | 4/2008 | Le et al. ............................ | 713/1 |
| 7,644,264 B1 * | 1/2010 | Olsen ................................ | 713/2 |
| 7,650,644 B2 * | 1/2010 | Cheng et al. .................... | 726/27 |
| 7,698,396 B2 * | 4/2010 | Aoyagi et al. ................. | 709/223 |
| 7,797,522 B2 * | 9/2010 | Zenz et al. ......................... | 713/1 |
| 7,802,084 B2 * | 9/2010 | Fitzgerald et al. ................ | 713/2 |
| 7,898,947 B2 * | 3/2011 | Briscoe et al. ................. | 370/230 |
| 7,984,108 B2 * | 7/2011 | Landis et al. ................. | 709/215 |
| 8,001,527 B1 * | 8/2011 | Qureshi et al. ................ | 717/120 |
| 8,037,453 B1 * | 10/2011 | Zawadzki ..................... | 717/123 |
| 8,041,793 B2 * | 10/2011 | Chawla et al. ................. | 709/222 |
| 8,135,815 B2 * | 3/2012 | Mayer ........................... | 709/223 |
| 8,145,735 B2 * | 3/2012 | Manchester et al. .......... | 709/220 |
| 8,417,796 B2 * | 4/2013 | Crosbie ......................... | 709/220 |

(Continued)

OTHER PUBLICATIONS vmware, SPECweb2005 Performance, ESX Server 3.5, Performance Study, 2008.

(Continued)

*Primary Examiner* — Eric Coleman
(74) *Attorney, Agent, or Firm* — Ryan, Mason & Lewis, LLP

(57) ABSTRACT

A configuration model for an existing software solution, which is distributed over a plurality of existing machines, is discovered. The model includes a plurality of configuration items, which in turn include a plurality of independent attributes and a plurality of dependent attributes, with the plurality of dependent attributes being derivable from the plurality of independent attributes based on a plurality of constraints. The configuration model is stored in a repository, together with disk images, resource configuration details, and logical names of pertinent ones of the existing machines. Specifications of new values of the independent attributes are obtained, and new values of the dependent attributes are computed from the new values of the independent attributes, based on executing the constraints on the configuration model. The images are deployed onto a plurality of new machines for operation in accordance with the new values of the independent attributes and the new values of the dependent attributes, to obtain a re-deployed solution. The machines can be virtual machines or physical machines.

24 Claims, 10 Drawing Sheets

(56) References Cited

U.S. PATENT DOCUMENTS

| | | | | |
|---|---|---|---|---|
| 2002/0124245 | A1* | 9/2002 | Maddux et al. | 717/176 |
| 2005/0229175 | A1* | 10/2005 | McCrory et al. | 717/177 |
| 2007/0006205 | A1* | 1/2007 | Kennedy et al. | 717/168 |
| 2007/0088630 | A1 | 4/2007 | MacLeod et al. | |
| 2007/0257715 | A1* | 11/2007 | Semerdzhiev et al. | 327/141 |
| 2007/0300220 | A1* | 12/2007 | Seliger et al. | 718/1 |

OTHER PUBLICATIONS

Li et al., A Platform Architecture to Support the Deployment of Distributed Applications, 2002, IEEE, Berlin, Germany.

Ma et al., Model-Based Dependency Management for Migrating Service Hosting Environment, 2007 IEEE International Conference on Services Computing.

Barham et al., Xen and the Art of Virtualization, 2003 ACM, New York, USA.

Sapuntzakis et al., Virtual Appliances for Deploying and Maintaining Software, Stanford University.

Brown et al., A Model of Configuration Complexity and its Application to a Change Management System, IBM T.J. Watson Research Center, Yorktown Heights, New York, USA.

Edwards et al., Model-driven Configuration and Deployment of Component Middleware Publisher/Subscriber Services, Department of Electrical Engineering and Computer Science, Vanderbilt University, Nashville, Tennessee.

Eilam et al., Managing the Configuration Complexity of Distributed Applications in Internet Data Centers, 2006 IEEE, IEEE Communications Magazine.

Randell et al., Visual Studio 2005, Bridge the Gap Between Development and Operations with Whitehorse, msdn, 2008 Microsoft Corporation.

Ganguly et al., Reducing Complexity of Software Deployment with Delta Configuration, 2007 IEEE.

Bill Shannon, JavaTM 2 Platform, Enterprise Edition Specification, v1.4, Nov. 24, 2003.

He et al., Automating deployment and activation of virtual images, 2008, IBM WebSphere Developer Technical Journal.

VMware: Virtualization via Hypervisor, Virtual Machine & Server Consolidation—VMware, http://www.vmware.com/.

Surgient, Self-Service Virtualization Automation and Lab Management, http://www.surgient.com/.

IBM—Tivoli Application Dependency Discovery Manager—Software, http://www-01.ibm.com/software/tivoli/products/taddm/.

Object Constraint Language, OMG Available Specification, Version 2.0, May 2006, cover page—p. 7.

OMG Unified Modeling Language (OMG UML), Infrastructure, V2.1.2, Nov. 2007, cover page—p. 26.

OMG Unified Modeling Language (OMG UML), Superstructure, V2.1.2., Nov. 2007, cover page—20.

Citrix Systems, Citrix XenServer: Efficient Virtual Server Software, http://citrix.com/English/ps2/products/product.asp?contentID=683148.

* cited by examiner

FIG. 2

```
context ds : Datasource
inv: DBName = ds.pointsTo.Name
inv: DBPort = ds.pointsTo.configuredOn.Port
inv: DBIP  = ds.pointsTo.configuredOn.runsOn.installedOn.IP
```

FIG. 3

```
context ds : Datasource
publisher:
let machine : String = ds.configuredOn.runsOn.installedOn.IP
let appServDir : String = ds.configuredOn.InstallDir
let dsName : String = ds.Name
let dbIP : String = ds.DBIP
let dbPort : String = ds.DBPort
DSConfigPublisher appServDir dsName dbIP dbPort
```

FIG. 6

| PRODUCT | CONFIGURATION TYPE | DESCRIPTION |
|---|---|---|
| VIRTUAL MACHINE | IP ADDRESS | INDEPENDENT VARIABLE |
| DATABASE SERVER | PORT | INDEPENDENT VARIABLE |
| DIRECTORY SERVER | PORT | INDEPENDENT VARIABLE |
| APPLICATION SERVER | PORT | INDEPENDENT VARIABLE |
| OPERATING SYSTEM | LOCAL DNS ENTRY | DEPENDENT VARIABLE: AN ENTRY IN /ETC/HOSTS FOR MAPPING LOGICAL MACHINE NAME TO THE IP ADDRESS |
| PROCESS SERVER | DATA SOURCE | DEPENDENT VARIABLE: CONTAINS THE IP ADDRESS AND PORT OF DATABASE SERVER |
| PROCESS SERVER | SECURITY CONFIGURATION | DEPENDENT VARIABLE: CONTAINS THE IP ADDRESS AND PORT OF DIRECTORY SERVER |
| CONTENT MANAGEMENT SERVER | POINTER TO DATABASE | DEPENDENT VARIABLE: CONTAINS THE IP ADDRESS AND PORT OF DATABASE SERVER |
| CONTENT MANAGEMENT SERVER | POINTER TO DOCUMENT STORE | DEPENDENT VARIABLE: CONTAINS THE IP ADDRESS AND HTTP PORT OF APPLICATION SERVER |

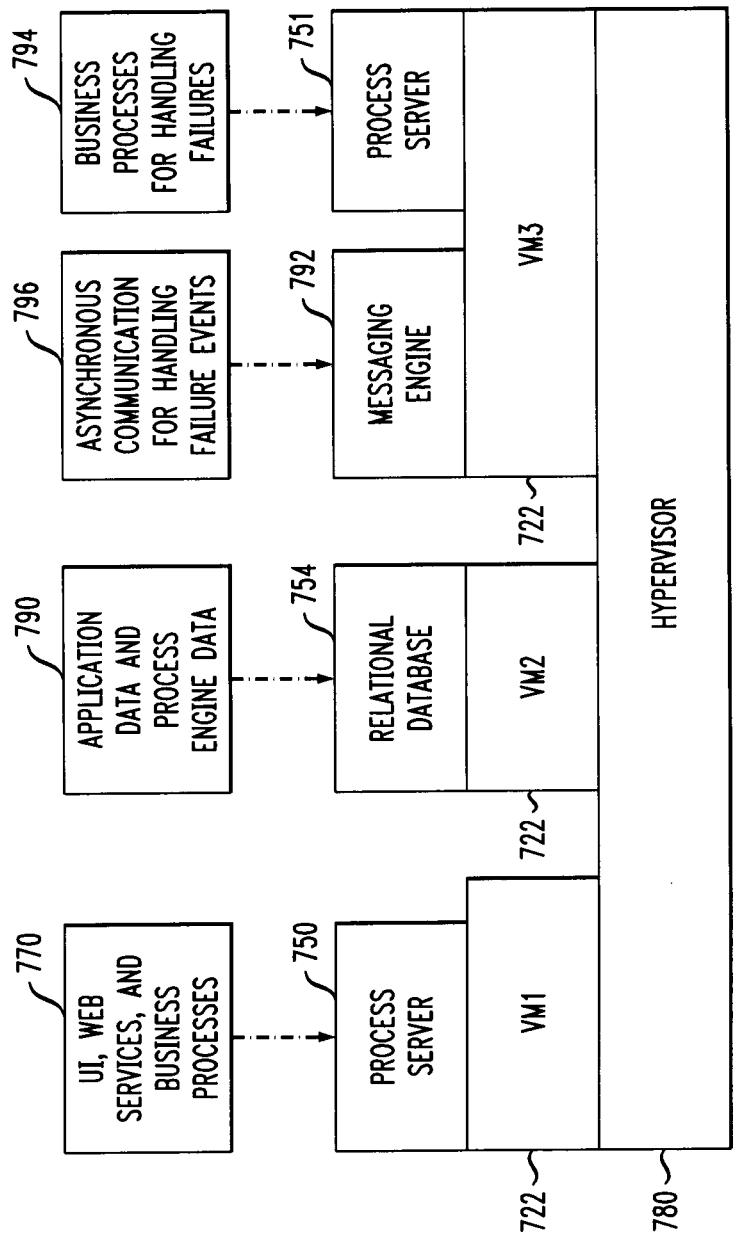

FIG. 8

| PRODUCT | CONFIGURATION TYPE | DESCRIPTION |
|---|---|---|
| MESSAGING ENGINE | PORT OF QUEUE MANAGER | INDEPENDENT VARIABLE |
| PROCESS SERVER | QUEUE CONNECTION CONFIGURATION | DEPENDENT VARIABLE: CONTAINS THE IP ADDRESS AND PORT OF QUEUE MANAGER |

METHOD, SYSTEM AND COMPUTER PROGRAM PRODUCT FOR SOLUTION REPLICATION

FIELD OF THE INVENTION

The present invention relates to the electrical, electronic and computer arts, and, more particularly, to solution migration and the like.

BACKGROUND OF THE INVENTION

The process of deployment from scratch for certain solutions (such as a service oriented architecture (SOA) based solution or a multi-tiered architecture solution) is time-consuming and labor intensive. These certain solutions may be referred to as multi-component solutions and/or composite solutions, since, on the one hand, such solutions may be deployed on more than one machine (distributed solutions), but on the other hand, in some instances, the same solution may be deployed even on a single machine.

Deployment is facilitated by using a deployment document or scripts, which are typically created by humans and usually out of synch with respect to the actual configuration of software stacks. These documents are prone to errors and result in enormous time being spent in resolving configuration parameters required by the application.

Currently, deployment of composite solutions is time and labor consuming. In particular, current techniques are document based; primarily manual, with unstructured use of scripts for automation. Furthermore, current approaches may be impractical, inasmuch as the inherent complexity of the solution, along with lack of complete knowledge and understanding in one person, further complicate the process of deployment; that is to say, impracticality may arise, for example, from incomplete documentation and/or incomplete skills. Typical deployment (installation+configuration) times may run, for example, 3-4 weeks.

In a first known method, typically, every time the solution is required, the deployment of the solution is started from scratch. This process is time consuming and labor intensive. In a second known method, image capture and restore technologies, including virtualization, can be used to facilitate automatic movement of the software stack or stacks, but current approaches do not offer the facility of automatic reconfiguration of the solution to adapt to the needs of the new environment. The variations in the new environment may range from changing the configurations, such as IP addresses, network masks, and the like, to changes in topology of the solution.

SUMMARY OF THE INVENTION

Principles of the invention provide techniques for solution replication. In one aspect, an exemplary method (which can be computer-implemented) includes the step of discovering a configuration model for an existing software solution that is distributed over a plurality of existing machines. The configuration model includes a plurality of configuration items. The plurality of configuration items in turn include a plurality of independent attributes and a plurality of dependent attributes, with the plurality of dependent attributes being derivable from the plurality of independent attributes based on a plurality of constraints. An additional step includes storing the configuration model in a repository, together with disk images, resource configuration details, and logical names of pertinent ones of the existing machines. Further steps include obtaining specifications of new values of the independent attributes, and computing new values of the dependent attributes from the new values of the independent attributes, based on executing the constraints on the configuration model. Another step includes deploying the images onto a plurality of new machines for operation in accordance with the new values of the independent attributes and the new values of the dependent attributes, to obtain a re-deployed solution. The machines can be virtual machines or physical machines.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of a system/apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 2 shows exemplary constraints, according to another aspect of the invention;

FIG. 3 shows an exemplary configuration publisher, according to a further aspect of the invention;

FIG. 6 shows a table with product knowledge for the exemplary solution of FIG. 5;

FIG. 7 shows an exemplary deployment topology of another SOA solution, according to an additional aspect of the invention;

FIG. 8 shows a table with product knowledge for the exemplary solution of FIG. 7;

DETAILED DESCRIPTION OF PREFERRED EMBODIMENTS

Figure 1:
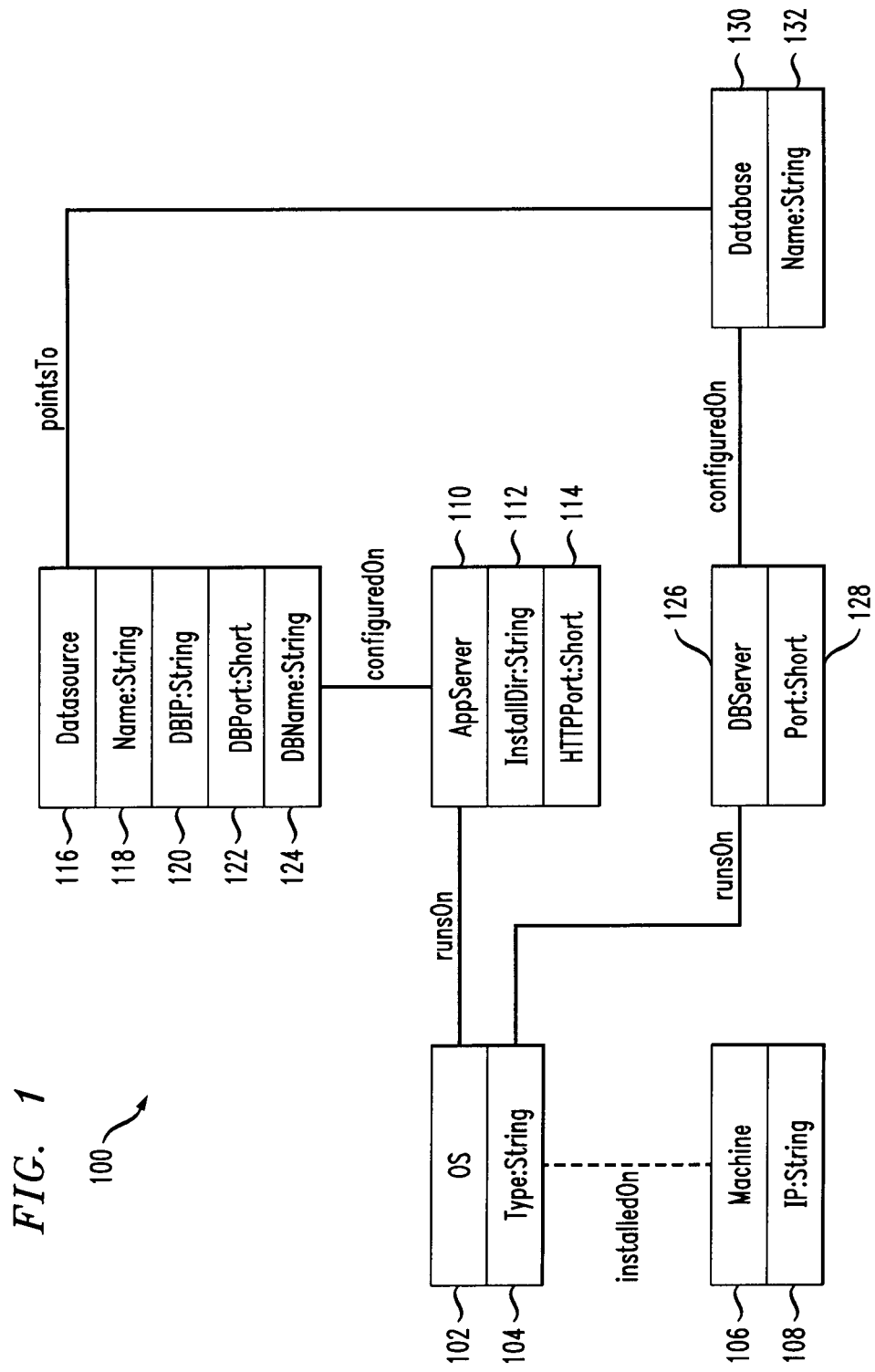
FIG. 1 shows an example configuration meta-model, according to an aspect of the invention.

Deployment is an important aspect of a software solutions' life-cycle and is repeatedly employed at many stages, including development, testing, delivery, and demonstration. Traditional script-based approaches for deployment are primarily manual and hence error prone, resulting in wasted time and labor. One or more embodiments of the invention provide a framework and approach for faster redeployment of distributed software solutions. In a non-limiting example, the solution is deployed on virtual machines using traditional methods. Environment-dependent configurations of the solution are discovered, and are preserved along with the images of virtual machines. For subsequent deployments, the preserved images are provisioned, and the entity performing deployment is provided an opportunity to change a subset of the recorded configurations that cannot be automatically derived; for example, IP addresses, ports, and the like. The remaining recorded configurations are derived by executing meta-model level constraints on the solution configuration model. The virtual machines are updated with new configurations by leveraging the semantics of appropriate scripts. One or more instances of the framework allow product experts to describe the configuration meta-model, constraints, and script semantics. This product knowledge is typically specified only once, and is reused across solutions for automatic configuration discovery and reconfiguration. One or more embodiments of the invention reduce the time for repeated deployments of a solution; for example, from an order of weeks to an order of hours.

The skilled artisan will be familiar with virtualization technologies such as XEN® software (registered mark of XenSource, LLC, Palo Alto, Calif., USA) and VMWARE® software (registered mark of VMWare, Inc., Palo Alto, Calif., USA). Virtualization technologies make it possible to move a virtual machine (VM) from one physical host to another. This feature is leveraged by creating a VM image with the desired software once, and copying the image multiple times for replication on another host. In a VM-based redeployment approach, environment-independent configurations typically do not need to be changed during redeployment. There are a variety of environment dependent configuration types that deal with different functional and non-functional properties of a solution such as security, performance, and the like. One or more embodiments of the invention address configuration types that deployers may require to in order to make the solution work, or may otherwise like to change in a different network environment, e.g., IP Address, ports, passwords, and the like.

One or more embodiments of the invention leverage existing configuration discovery solutions for capturing the configuration model of a distributed solution deployed on VMs. Such existing solutions are per se known to the skilled artisan; one example is Tivoli Application Dependency Discovery Manager, http://www.ibm.com/software/tivoli/products/taddm/. Further, aspects of the invention provide a mechanism for product experts to describe relevant knowledge about configuration types, in addition to the configuration meta-model. The additional knowledge primarily includes the semantics of the constraints among configuration values and the semantics of scripts for updating software stacks.

In one or more instances of the invention, the distributed solution is first deployed and tested on a set of VMs in a laboratory environment, using traditional methods. The system then discovers the configuration model of the solution and preserves it along with the VM images. At the time of redeployment in a different environment, preserved images are provisioned and the entity undertaking deployment is provided an opportunity to change selective preserved configurations; for example, IP addresses, ports, usernames, passwords, and the like. The remaining preserved configurations are derived by executing constraints on the solution configuration model. The provisioned images are updated by executing appropriate scripts. The script semantics are leveraged for automated script execution.

Advantageously, one or more embodiments of the invention do not require a solution expert; product knowledge is leveraged to make the manual effort in preparing a solution for repeated deployments insignificant. One or more embodiments of the invention provide a framework for product experts to represent the relevant product knowledge at the configuration meta-model level, such that it is leveraged in an automated manner. This enables a wide variety of distributed software solutions for rapid redeployment. Also, this eliminates the need for the manual effort of a solution expert. Further, in one or more embodiments of the invention, product experts are only required to describe the knowledge about a few configuration types, thereby increasing practicality.

The skilled artisan will be familiar with so-called virtual appliances, that is, a network of virtual machines pre-installed and pre-configured with complex stacks of software, which aim to eliminate installation, configuration and maintenance costs, by minimizing human intervention. Virtual appliances are described in C. Sapuntzakis, et al., "Virtual appliances for deploying and maintaining software," Proceedings of the Seventeenth Large Installation Systems Administration Conference (LISA 2003). Aspects of the invention build on the notion of virtual appliances, additionally encapsulating environment dependent configurations, to help service providers to quickly deliver solutions including a wide variety of third party products and/or components.

One or more embodiments of the invention provide an extensible architecture, where the models are connected to the scripting world by relevant knowledge representation, and the values required by the scripts are automatically obtained from the models. Furthermore, unlike certain techniques limited to handling changes in IP address, one or more instances of the invention handle a wide range of variations in environments, including other parameter types such as ports, user names and/or passwords, and the like. Furthermore, one or more embodiments of the invention can be extended to handle topology changes during redeployment. The topology changes can be achieved, for example, by making multiple copies of the disk images and enabling few components in each copy. These kind of topology changes usually are applicable in a target environment where the deployer wants to distribute the components (earlier installed in single disk image) or for changing the cluster sizes, primarily for scale-out deployment, and so on.

One or more embodiments of the invention make use of the discovery of configuration items (CIs) and relationships among CIs across the software stack in a distributed environment. There are mature techniques and tools for discovering CIs and the relationships among them. A non-limiting example, with which the skilled artisan will be familiar, is Tivoli Application Dependency Discovery Manager (TADDM), http://www.ibm.com/software/tivoli/products/taddm/, a commercially available tool that discovers the various configurations and relationships, and stores them in a database. TADDM is available from International Business Machines Corporation, Armonk, N.Y., USA.

Instead of building a whole new meta-model for representing the configuration and topology information, one or more instances of the invention leverage the meta-model exposed by the discovery tools. In one or more embodiments, product experts are allowed to add additional required or helpful knowledge on top of the existing meta-model. FIG. 1 illustrates a partial meta-model 100 of the configuration information provided by discovery tools. Application server 110 runs on operating system (OS) 102, and the type of OS is identified by a string variable 104. The install directory of server 110 is identified by a string variable 112, while the hypertext transfer protocol (HTTP) port is identified by short variable 114. Data source 116 is configured on server 110 and its name is identified by a string variable 118, as are its DBIP and database name, as indicated at 120, 124 respectively. Note, DBIP means Database IP, DBPort means Database port. The configuration of the app server enables it to communicate with the database. The port is identified by a short variable, as shown at 122. OS 102 is installed on machine 106 with IP address given by a string variable at 108. Database server 126 runs on OS 102. The port of server 126 is identified by short variable 128. Datasource 116 points to database 130, which is configured on server 126 and has its name identified by a string variable as shown at 132.

The additional knowledge about the products required in one or more embodiments of the invention falls into three categories, namely, independent attributes, dependent attributes, and configuration publishers.

Independent Attributes

An independent attribute refers to an attribute of an element type in the configuration meta-model, which the deploying entity is allowed to assign a new value in the target deployment environment. Often, deploying entities change the values of attributes of type IP addresses, ports of server components, username and/or passwords, and the like, of a few components. In FIG. 1, examples of independent attributes include Machine:IP, AppServer:HTTPPort, DBServer:Port, and so on.

In one or more exemplary instances of a framework, according to one or more aspects of the invention, an extensible list of independent attributes is maintained. The list can be extended by product experts, simply by adding more attribute types to the list. This list is used at the time of redeployment of a solution, for computing the attributes whose values can be changed by the deploying entity in the target environment.

Dependent Attributes

An attribute of an element type in the meta-model, is referred to herein as a dependent attribute, if and only if, the value of the attribute can be derived from the value of another attribute in a given model. In FIG. 1, Datasource:DBPort is an example of a dependent attribute, as the value of the DBPort attribute of a Datasource is always equal to the value of the Port attribute of the DBServer to which the Datasource has a path named pointsTo:configuredOn. In an exemplary framework, the knowledge about deriving the values of dependent attributes is represented in terms of constraints. The product experts can keep adding such constraints into the framework. FIG. 2 is a non-limiting example of constraints, represented in Object Constraint Language (OCL), in the context of Datasource 116. The skilled artisan will be familiar with OCL from, for example, the Object Constraint Language Specification, version 2.0, http://www.omg.org/technology/documents/formal/ocl.htm.

Configuration Publishers

A configuration publisher is a script descriptor, associated with one of the meta-model element types. It updates the configuration value from the model to the actual configuration item in the installed system. Most products are provided with management shell commands, scripts, and application program interfaces (APIs) to update the configuration items. These management operations are invoked with certain parameters; for example, for updating the values of attributes of a Datasource configuration item, the corresponding management script may need to know the machine name on which the application server is installed, the application server identification, the name of the datasource, and finally new values that need to be set for the attributes of the Datasource.

In order to automatically update the configurations in the target environment, one or more embodiments provide a mechanism for product experts to describe the knowledge about management operations into a descriptor. FIG. 3 is an example of the configuration publisher associated with the Datasource 116 in FIG. 1. The descriptor presented in FIG. 3 is an extension to OCL that includes the publisher expression. The last statement in the publisher block captures the script execution command. Other expressions, such as context, and let are interpreted in the same way, as in pure OCL. Furthermore, if a let expression defines a variable named machine, it is assumed that the script command is to be executed at a particular machine with address machine; otherwise the script is assumed to be execution location independent.

Architecture and Method

Figure 4:
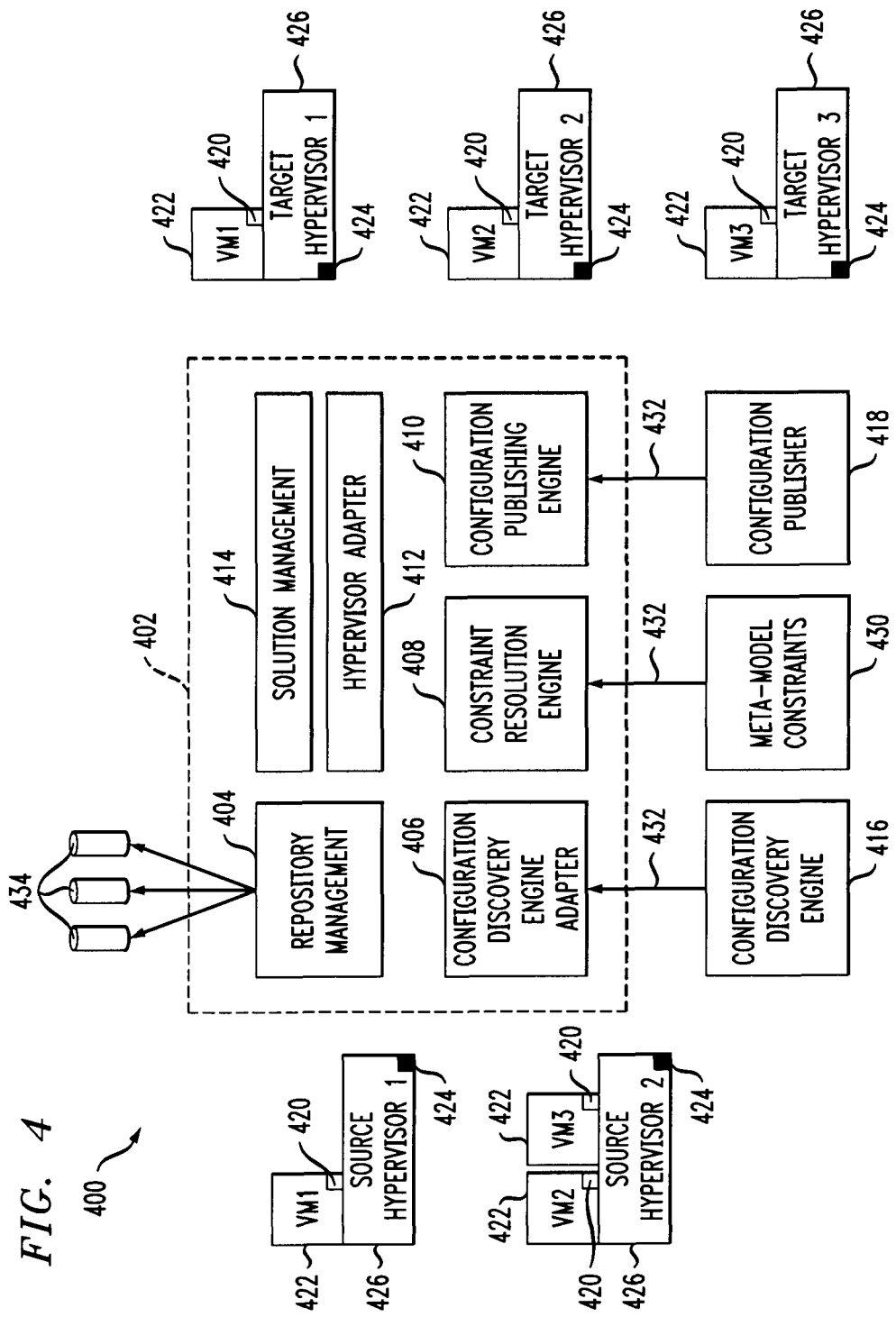
FIG. 4 presents an architecture of an exemplary framework, according to a still further aspect of the invention.

With reference to FIG. 4, exemplary components of an embodiment of an architecture 400 suitable for implementing aspects of the invention will now be described, as will exemplary steps in a method for deploying distributed solutions, according to an aspect of the invention. In one or more embodiments, the framework consumes the product knowledge described by the experts, as explained above, to achieve the automation. Inside the dotted boundary 402 in FIG. 4 are significant components of the architecture. Repository management module 404 is responsible for adding any machine into the framework to act as a repository 434. Configuration discovery engine adapter module 406 controls the basic functions of any configuration discovery engine 416, including setting the discovery scope, executing the discovery engine, collecting the discovered configuration model, and converting the configuration model into a common representation. It should be noted that in one or more embodiments, only the model, meta-model, and constraints are required to be in a uniform representation; for example, a UML 2.0 Class diagram. The skilled artisan will be familiar with Unified Modeling Language (UML), for example, from http://www.omg.org/technology/documents/modeling_spec_catalog.htm#UML. In one or more embodiments, the framework is otherwise neutral to the meta-model. Any configuration discovery engine can be used with one or more embodiments of the framework, by adding the corresponding adapter.

Constraint Resolution Engine 408 maintains and executes the constraints 430 on the configuration model, in order to derive the values of dependent attributes, as explained above. The final output of this is a new consistent configuration model, if the values of some of the independent attributes are modified. In one or more embodiments, the order of execution of constraints is not important, since all the user specified constraints are transformed to constraints where dependent attributes depend directly on the independent attributes. Configuration publishing engine 410 updates the configurations from the model to the actual software stacks. It interprets the configuration publisher 418, discussed above, and executes the appropriate script with required parameter values derived from the model. A configuration agent 420, which can be installed on each virtual machine 422, is used for executing the final commands prepared by the configuration publishing engine 410. Hypervisor adapter 412 abstracts out commands used on different hypervisors, for example, locating the files for virtual machine configurations and disk on the hypervisor file system, creating a virtual machine out of an existing disk, and so on. A hypervisor agent 424, installed on each hypervisor 426, executes the commands on the hypervisors. Finally, solution management module 414 instantiates and orchestrates the components described above for backup and restore of a solution. Arrows 432 depict extension of the knowledge base.

Backup

Figure 9:
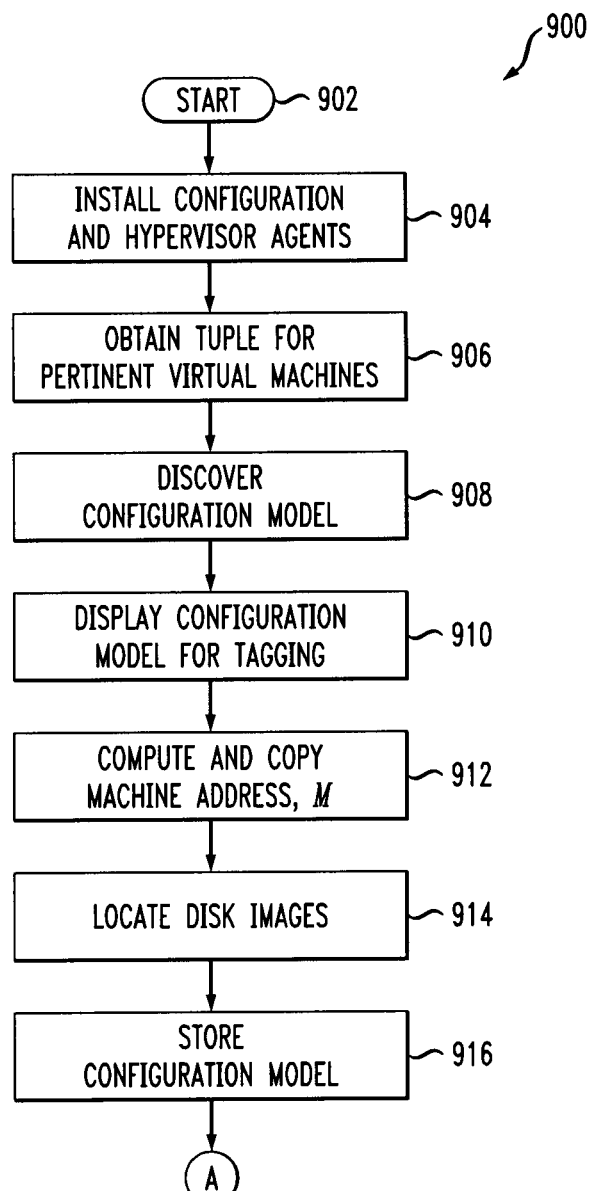
FIGS. 9 and 10 a flow chart of exemplary method steps, according to a non-limiting embodiment.

Exemplary method steps, performed for taking the backup of an already deployed distributed solution on a set of VMs, will now be described with reference to flow chart 900 of FIG. 9. Processing begins at step 902. In step 904, the user installs the configuration agent 420 on each VM 422 and the hypervisor agent 424 on each hosting hypervisor 426. For each VM 422 involved in the solution, the user supplies to the framework a tuple including the IP address of the VM 422, the IP address of hosting hypervisor 426, and a logical name for the VM 422, as indicated at step 906. The framework executes the discovery engine 416 for discovering the configuration model, as shown at step 908. The discovery engine is configured to limit the scope of discovery to the VMs 422 comprising the solution. The framework displays the configuration model in a visual form, for the user to tag logical names to one or more of the independent attributes, as in step 910. This is to distinguish between more than one similar independent attribute; for example, the user may want to differentiate between HTTP ports of two application servers in the solution. In order to make it easier to locate similar independent attributes, they may be grouped, for example, by showing them in the same color in the visual model.

For each configuration item present in the configuration model, the framework computes the machine address M for the corresponding script, based on the "let machine:" expression in the associated configuration publisher 418, and copies the script to the VM 422 with address M, with the help of the Configuration Agent 420, as shown in step 912. The framework locates (or stated alternatively, prepares) the VM disk image and VM resource configuration details for the given VMs, with the help of Hypervisor Agent 424, as in step 914. The framework stores the configuration model and associated tuples (in this case, VM disk image, VM resource configuration details, and VM logical name) into the repositories 434, with a unique solution name, in step 916.

Replicate

Figure 10:
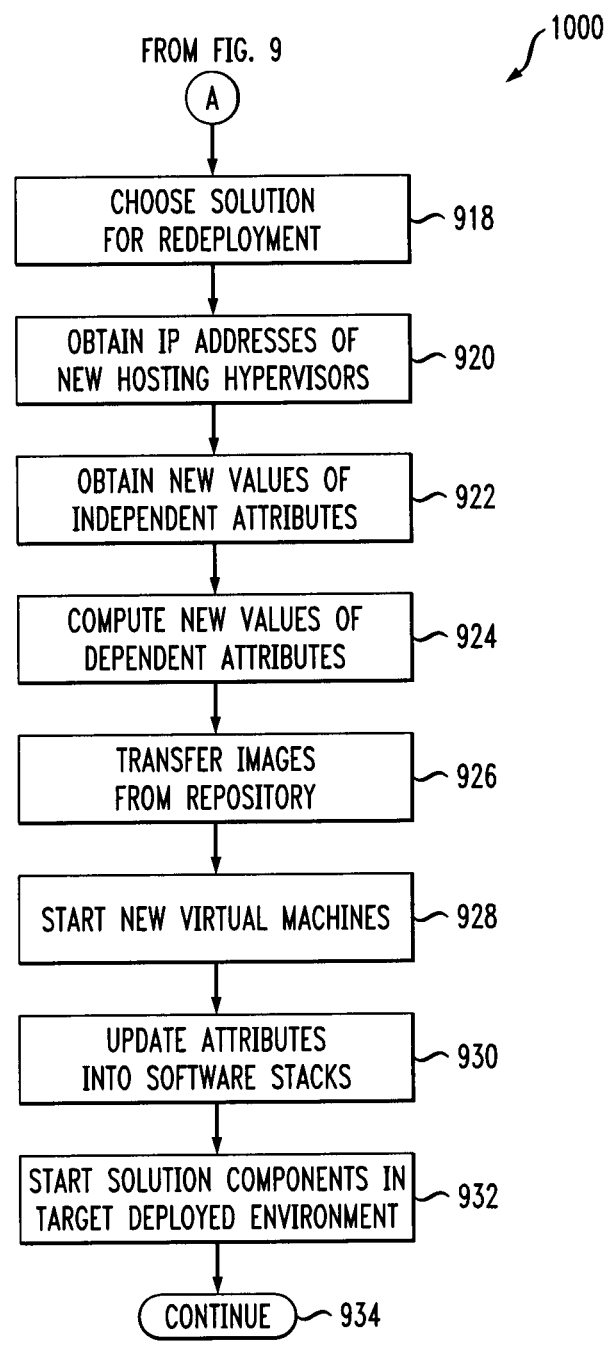

Exemplary method steps, performed for replicating the distributed software service in a target deployment environment, will now be described with respect to flow chart 1000 of FIG. 10, which continues the flow chart 900 of FIG. 9, from point "A." In step 918, the user chooses one of the solutions in the repository 434 for redeployment. The framework prompts the user for IP addresses of hypervisor machines for each VM 422 to be deployed, in step 920. The Hypervisor agent 424 is expected to be running on each of the hypervisors. In step 922, the framework prompts the user for specifying the new values of each of the independent attributes present in the configuration model of the solution. The framework computes the new values of the dependent attributes, in step 924, by executing the constraints on the configuration model. The framework transfers the disk image and the resource configuration details for each VM 422 from the repository 434 to the corresponding hypervisor, in step 926, and creates the virtual machine(s), with the help of the hypervisor agents 424.

In step 928, the framework starts off the virtual machines and assigns the new IP addresses to the virtual machines during the startup process. The independent attribute type Machine:IP (in FIG. 1) is treated as a special type, inasmuch as, in order to update any other configuration item in the software stacks, the virtual machines 422 should be reachable from the framework. This can happen if the new IP addresses for the virtual machines are used for starting them. One exemplary technique for updating the IP address of the virtual machines while booting is to map a file on the host machine to the virtual diskette drive of the VM and to have a preconfigured service in the VM read the IP address from the file and update the VM. The skilled artisan will be familiar with automating deployment and activation of virtual images, from, for example, http://www.ibm.com/developerworks/websphere/techjournal/0708_he/0708_he.html.

For updating each modified independent and dependent attribute into the software stacks, in step 930, the framework executes the corresponding scripts with appropriate parameter values on the corresponding virtual machine, with the help of the configuration agent 420, which starts up automatically with the virtual machine starting process. For simplicity, in the exemplary embodiment described herein, it is assumed that the scripts for modifying the configurations of components do not depend on the state of the software components. In some cases, a few specific scripts may require the software components to be in a running state. Corresponding extensions to the configuration publisher 418, and the distributed solution booting process, can be implemented by the skilled artisan, given the teachings herein. Finally, the framework prompts the user to start the solution components, in order to make the service available in the target deployment environment, as in step 932. Processing continues in step 934.

In an exemplary implementation, a light weight configuration discovery engine 416 is capable of discovering selective configurations for most commonly used products in a typical SOA environment. Constraints and the configuration publisher 418 can be implemented in OCL syntax.

Example

By way of example and not limitation, consider two distributed SOA solutions, referred to as Solution1 and Solution2, from the deployment perspective. Both of the solutions are built using a JAVA 2 platform enterprise edition (J2EE) based SOA platform, and are first deployed by the respective solution experts using traditional approaches. This involves the installation and configuration of the entire software stack. In order to evaluate a non-limiting exemplary embodiment of the invention for repeated deployments, the relevant product knowledge can be added into an instance of the inventive framework. The product knowledge is independent of the solution, that is, it is added to the framework only once, and repeatedly leveraged. As described above, specifying the product knowledge involves extending the configuration discovery, adding the constraints, and adding script semantics. Also, this knowledge is limited to only specific environment-dependent configuration types. For subsequent deployments, the exemplary framework can be used to verify intuitions. In a non-limiting example, the time spent in deployment, using an exemplary embodiment of the framework, reduces to an order of hours from the order of weeks that is the norm in traditional deployment approaches. Further, in one or more embodiments, the product configuration knowledge of interest is less than 5% of the total configuration types.

Figure 5:
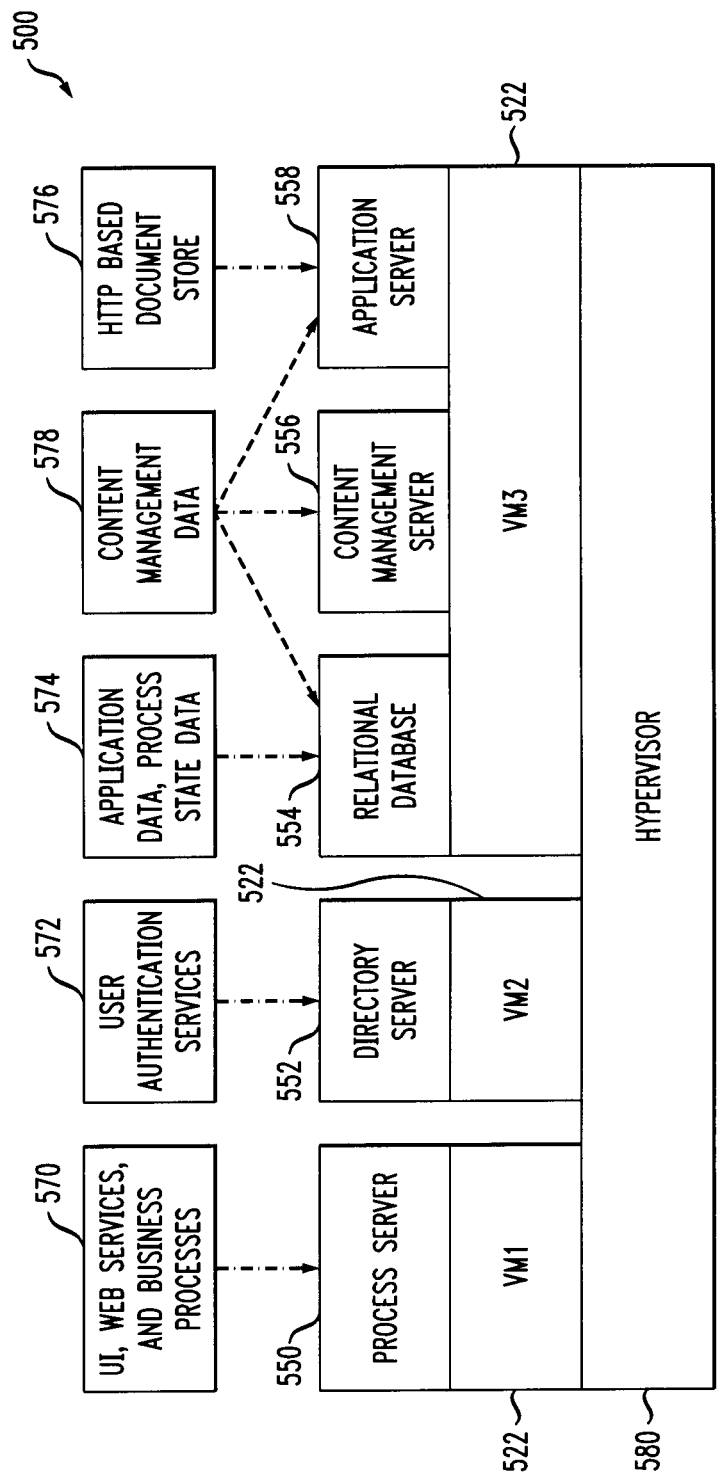
FIG. 5 shows an exemplary deployment topology of an SOA solution, according to an even further aspect of the invention.

FIG. 5 depicts a deployment topology 500 of Solution1. The topology includes hypervisor 580 and three virtual machines 522. VM1 includes an application server with process server (process server 550) that hosts the user interface (UI), web services, and processes components 570 (the processes may be associated with, for example, an enterprise such as a business enterprise). VM2 includes a directory server 552 for supporting user level security, such as user authentication services 572. VM3 includes three software products, namely, relational database 554, a content management server 556, and an application server 558. As indicated at block 574, the relational database 554, apart from maintaining the application data, also maintains the process state data (for storing the state of process instances execution), and the meta-data 578 for the content management server 556.

The application server 558 serves as an HTTP based document store 576 for the content management server 556.

FIG. 6 shows the configuration items (product in first column 602, configuration type in second column 604, and description in third column 606) whose knowledge can be added into the framework for enabling it to work for redeployment of Solution 1 on the new set of machines. FIG. 7 depicts the deployment topology of Solution 2. Again the topology includes hypervisor 780 and three virtual machines 722. VM1 contains a Process Server 750 that hosts the UI, web services, and processes components 770 (the processes may be associated with, for example, an enterprise such as a business enterprise). VM2 contains a relational database 754, which, apart from maintaining the application data as shown at block 790, is used by the process server 750 for maintaining process instances state data. VM3 contains a messaging engine 792 as well as another process server 751. The messaging engine 792 is used, as shown at 796, for asynchronous communication between process server 750 on VM1 722 and process server 751 on VM3. In case of certain failures in processes on VM1, the appropriate messages are sent to designated queues in the messaging engine 792 and arrival of a message in a queue triggers the starting of the appropriate failure handling business process 794 on VM3.

FIG. 8 shows the configuration items (product in first column 802, configuration type in second column 804, and description in third column 806) whose knowledge are added to extend the framework, enabling it to work for deployment of Solution 2.

It should be noted that the full configuration model of an SOA solution typically contains a vast amount of information. However, in one or more embodiments of the invention, only very few configuration types, as shown in FIGS. 6 and 8, need to be considered. The full configuration model includes quite a few environment-independent configuration details; for example, software product versions, fix packs, class path setting for the application server 110, library settings for accessing the database server 126 from the application server, and so on. Since, in one or more embodiments, the deployment approach copies VMs onto the new physical host machines as is, there is little or no need to care for environment independent configuration details that comprise a majority of the solution configuration. Typically, the configurations that need to be taken care in one or more embodiments of the invention are less than 5% of the total configurations that need to be handled in traditional deployment approaches. One or more embodiments of the invention require only a significantly scaled down knowledge base, and hence are more practical than current techniques.

It should also be noted that, since one or more embodiments of the invention are based on leveraging product knowledge, unlike in certain current techniques, the solution expert is not required to describe the details of every occurrence of each environment-dependent configuration type; for example, in Solution 2, there are in fact ten occurrences of data source configuration, putting together the two process servers. All of them are discovered by the configuration discovery engine 416, and the same constraint and configuration publisher 418 knowledge applies to all of them, for deriving and updating the values in the target deployment environment.

Furthermore, in one or more embodiments, the product experts need to feed their knowledge into the framework only once, and the system re-uses the knowledge across solutions; for example, though the Process Server in SOA Solution 2 contains configuration items of type Data Source, the knowledge about this is not added into the framework (see FIG. 8), because it was added when the framework for SOA Solution1 (see FIG. 6) was extended.

Note also that most of the time in the exemplary backup and replicate methods of deployment presented herein is spent in moving the VMs from the repository 434 to the target environment. This time depends on network speed, image sizes, disk speeds, and so on, and is usually of the order of hours, as opposed to a few weeks, as is taken in traditional methods.

One or more embodiments of the invention thus provide an approach for rapid, repeated deployments of distributed software services, leveraging virtualization technologies and configuration discovery solutions. Furthermore, one or more embodiments provide a framework for product experts to describe the relevant knowledge that is reused across multiple solutions for deployment and configuration. In at least some cases, implementations of the invention overcome the drawback of model-driven and scripting-driven techniques, by reducing the configuration details that need to be described in the model and by systematically linking the models to the scripts. One or more embodiments only need to capture the configurations that are environment-dependent.

It should be noted that one or more exemplary embodiments have been presented in the context of virtual machines and have employed exemplary terminology used in the virtualization domain (e.g. hypervisor, locating disk images). However, the invention is not limited to the virtualization context, and in one or more embodiments, can be applied to physical machines as well.

In one or more embodiments, systems, apparatuses, computer program products and/or methods as described herein are used for solution replication.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Indeed, as will be appreciated by one skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In a preferred approach, an engine with remote agents is employed.

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 11:
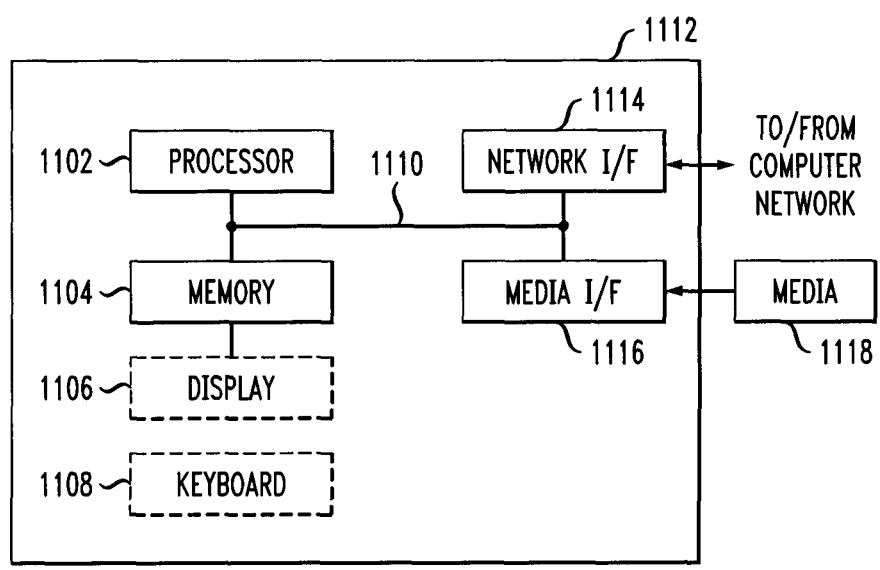
FIG. 11 depicts a computer system that may be useful in implementing one or more aspects and/or elements of the present invention.

One or more embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1118) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a tangible propagation medium. Examples of a tangible computer-readable storage medium include a semiconductor or solid-state memory (for example memory 1104), magnetic tape, a removable computer diskette (for example media 1118), a random access memory (RAM), a read-only memory (ROM), a rigid magnetic disk and an optical disk. Current examples of optical disks include compact disk-read only memory (CD-ROM), compact disk-read/write (CD-R/W) and DVD.

A system, preferably a data processing system, suitable for storing and/or executing program code will include at least one processor 1102 coupled directly or indirectly to memory elements 1104 through a system bus 1110. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   discovering environment-dependent configurations of a configuration model for an existing software solution that is distributed over a plurality of existing virtual machines, said environment-dependent configurations comprising a plurality of configuration items pertaining to at least one of security and performance, said plurality of configuration items in turn comprising a plurality of independent attributes and a plurality of dependent attributes, wherein said independent attributes are attributes of element types in the configuration model and said dependent attributes are attributes of element types in the configuration model having values derived from values of another attribute in the configuration model, and said plurality of dependent attributes being derivable from said plurality of independent attributes based on a plurality of constraints;
   storing said environment-dependent configurations in a repository, together with disk images of the virtual machines, resource configuration details, and logical names of pertinent ones of said existing machines;
   obtaining specifications of new values of said independent attributes for the environment-dependent configurations according to a software solution for a separate network environment of virtual machines;
   computing new values of said dependent attributes from said new values of said independent attributes, based on executing said constraints on said configuration model; and
   re-deploying the configuration model in the separate network environment of virtual machines to provide the software solution for the separate network environment by:
     provisioning said images;
     providing an entity performing said re-deployment an opportunity to modify one or more of said independent attributes from a collection comprising (i) internet protocol addresses, (ii) ports, (iii) usernames, and (iv) passwords;
     deriving the remaining configurations of the configuration model from the repository by executing meta-model level constraints on the configuration model; and
     updating the virtual machines in the separate network environment with the new configuration model.

2. The method of claim 1, wherein said existing machines comprise existing virtual machines and wherein said new machines comprise new virtual machines.

3. The method of claim 2, further comprising prompting a user to tag independent attribute logical names to selected ones of said independent attributes, to facilitate distinguishing among similar ones of said independent attributes.

4. The method of claim 3, wherein said prompting comprises visually displaying said configuration model.

5. The method of claim 2, further comprising:
   installing a configuration agent on each of said existing virtual machines, each of said existing virtual machines being associated with one of a plurality of existing hosting hypervisors;
   installing an instance of a hypervisor agent on each of said existing hosting hypervisors; and
   obtaining, for each given one of said existing virtual machines involved with said existing software solution, a tuple comprising:
     an Internet protocol address of said given one of said existing virtual machines;
     an Internet protocol address of an associated one of said plurality of existing hosting hypervisors; and
     a corresponding one of said logical names for said given one of said existing virtual machines;
   wherein said discovering step comprises executing a discovery engine with said tuples as inputs.

6. The method of claim 2, wherein said configuration items have associated therewith a plurality of configuration publishers, further comprising:
   for each of said configuration items present in said configuration model, computing a machine address for a corresponding script, based on an associated one of said configuration publishers;

copying said script to a corresponding one of said virtual machines having said computed machine address; and preparing said disk images.

7. The method of claim 2, further comprising obtaining, for each of said new virtual machines, Internet protocol addresses for each of a plurality of corresponding new hosting hypervisors; wherein said deploying of said images comprises:
transferring said images from said repository to a corresponding one of said new hosting hypervisors; and
creating said new virtual machines with instances of said hypervisor agent running on said new hosting hypervisors.

8. The method of claim 7, wherein said deploying further comprises updating said new values of said dependent attributes and said new values of said independent attributes to software stacks associated with said re-deployed solution, by executing scripts on said new virtual machines.

9. The method of claim 2, wherein said existing solution has a plurality of components, further comprising addressing a topology change between said existing solution and said re-deployed solution by preparing multiple copies of said disk images, each of said multiple copies of said disk images having a subset of said components enabled thereon.

10. The method of claim 1, wherein said existing machines comprise existing physical machines and wherein said new machines comprise new physical machines.

11. A system comprising:
means for discovering environment-dependent configurations of a configuration model for an existing software solution that is distributed over a plurality of existing virtual machines, said environment-dependent configurations comprising a plurality of configuration items pertaining to at least one of security and performance, said plurality of configuration items in turn comprising a plurality of independent attributes and a plurality of dependent attributes, wherein said independent attributes are attributes of element types in the configuration model and said dependent attributes are attributes of element types in the configuration model having values derived from values of another attribute in the configuration model, and said plurality of dependent attributes being derivable from said plurality of independent attributes based on a plurality of constraints;
means for storing said environment-dependent configurations in a repository, together with disk images of the virtual machines, resource configuration details, and logical names of pertinent ones of said existing machines;
means for obtaining specifications of new values of said independent attributes;
means for computing new values of said dependent attributes from said new values of said independent attributes, based on executing said constraints on said configuration model; and
means for re-deploying the configuration model in the separate network environment of virtual machines to provide the software solution for the separate network environment by:
provisioning said images;
providing an entity performing said re-deployment an opportunity to modify one or more of said independent attributes from a collection comprising (i) internet protocol addresses, (ii) ports, (iii) usernames, and (iv) passwords;
deriving the remaining configurations of the configuration model from the repository by executing meta-model level constraints on the configuration model; and
updating the virtual machines in the separate network environment with the new configuration model.

12. A computer program product comprising a tangible computer readable storage memory device including computer usable program code, said computer program product including:
computer usable program code for discovering environment-dependent configurations of a configuration model for an existing software solution that is distributed over a plurality of existing virtual machines, said environment-dependent configurations comprising a plurality of configuration items pertaining to at least one of security and performance, said plurality of configuration items in turn comprising a plurality of independent attributes and a plurality of dependent attributes, wherein said independent attributes are attributes of element types in the configuration model and said dependent attributes are attributes of element types in the configuration model having values derived from values of another attribute in the configuration model, and said plurality of dependent attributes being derivable from said plurality of independent attributes based on a plurality of constraints;
computer usable program code for storing said environment-dependent configurations in a repository, together with disk images of the virtual machines, resource configuration details, and logical names of pertinent ones of said existing machines;
computer usable program code for obtaining specifications of new values of said independent attributes;
computer usable program code for computing new values of said dependent attributes from said new values of said independent attributes, based on executing said constraints on said configuration model; and
computer usable program code for re-deploying the configuration model in the separate network environment of virtual machines to provide the software solution for the separate network environment by:
provisioning said images;
providing an entity performing said re-deployment an opportunity to modify one or more of said independent attributes from a collection comprising (i) internet protocol addresses, (ii) ports, (iii) usernames, and (iv) passwords;
deriving the remaining configurations of the configuration model from the repository by executing meta-model level constraints on the configuration model; and
updating the virtual machines in the separate network environment with the new configuration model.

13. The computer program product of claim 12, wherein said existing machines comprise existing virtual machines and wherein said new machines comprise new virtual machines.

14. The computer program product of claim 13, further comprising computer usable program code for prompting a user to tag independent attribute logical names to selected ones of said independent attributes, to facilitate distinguishing among similar ones of said independent attributes.

15. The computer program product of claim 14, wherein said computer usable program code for prompting comprises computer usable program code for visually displaying said configuration model.

16. The computer program product of claim 13, further comprising:
- computer usable program code for installing a configuration agent on each of said existing virtual machines, each of said existing virtual machines being associated with one of a plurality of existing hosting hypervisors;
- computer usable program code for installing an instance of a hypervisor agent on each of said existing hosting hypervisors; and
- computer usable program code for obtaining, for each given one of said existing virtual machines involved with said existing software solution, a tuple comprising:
  - an Internet protocol address of said given one of said existing virtual machines;
  - an Internet protocol address of an associated one of said plurality of existing hosting hypervisors; and
  - a corresponding one of said logical names for said given one of said existing virtual machines;
- wherein said computer usable program code for discovering comprises computer usable program code for executing a discovery engine with said tuples as inputs.

17. The computer program product of claim 13, wherein said configuration items have associated therewith a plurality of configuration publishers, further comprising:
- for each of said configuration items present in said configuration model, computer usable program code for computing a machine address for a corresponding script, based on an associated one of said configuration publishers;
- computer usable program code for copying said script to a corresponding one of said virtual machines having said computed machine address; and
- computer usable program code for preparing said disk images.

18. The computer program product of claim 13, further comprising computer usable program code for obtaining, for each of said new virtual machines, Internet protocol addresses for each of a plurality of corresponding new hosting hypervisors; wherein said computer usable program code for deploying of said images comprises:
- computer usable program code for transferring said images from said repository to a corresponding one of said new hosting hypervisors; and
- computer usable program code for creating said new virtual machines with instances of said hypervisor agent running on said new hosting hypervisors.

19. The computer program product of claim 18, wherein said computer usable program code for deploying further comprises computer usable program code for updating said new values of said dependent attributes and said new values of said independent attributes to software stacks associated with said re-deployed solution, by executing scripts on said new virtual machines.

20. The computer program product of claim 13, wherein said existing solution has a plurality of components, further comprising computer usable program code for addressing a topology change between said existing solution and said re-deployed solution by preparing multiple copies of said disk images, each of said multiple copies of said disk images having a subset of said components enabled thereon.

21. The computer program product of claim 12, wherein said existing machines comprise existing physical machines and wherein said new machines comprise new physical machines.

22. A system comprising:
- a memory; and
- at least one processor, coupled to said memory, and operative to
  - discover environment-dependent configurations of a configuration model for an existing software solution that is distributed over a plurality of existing virtual machines, said environment-dependent configurations comprising a plurality of configuration items pertaining to at least one of security and performance, said plurality of configuration items in turn comprising a plurality of independent attributes and a plurality of dependent attributes, wherein said independent attributes are attributes of element types in the configuration model and said dependent attributes are attributes of element types in the configuration model having values derived from values of another attribute in the configuration model, and said plurality of dependent attributes being derivable from said plurality of independent attributes based on a plurality of constraints;
  - store said environment-dependent configurations in a repository, together with disk images of the virtual machines, resource configuration details, and logical names of pertinent ones of said existing machines;
  - obtain specifications of new values of said independent attributes;
  - compute new values of said dependent attributes from said new values of said independent attributes, based on executing said constraints on said configuration model; and
  - re-deploy the configuration model in the separate network environment of virtual machines to provide the software solution for the separate network environment by:
  - provisioning said images;
  - providing an entity performing said re-deployment an opportunity to modify one or more of said independent attributes from a collection comprising (i) internet protocol addresses, (ii) ports, (iii) usernames, and (iv) passwords;
  - deriving the remaining configurations of the configuration model from the repository by executing meta-model level constraints on the configuration model; and
  - updating the virtual machines in the separate network environment with the new configuration model.

23. The system of claim 22, wherein said existing machines comprise existing virtual machines and wherein said new machines comprise new virtual machines.

24. The system of claim 22, wherein said existing machines comprise existing physical machines and wherein said new machines comprise new physical machines.

* * * * *